Dec. 16, 1969   F. J. DENT ET AL   3,484,219
PROCESS AND APPARATUS FOR PERFORMING CHEMICAL REACTIONS
Filed July 21, 1966
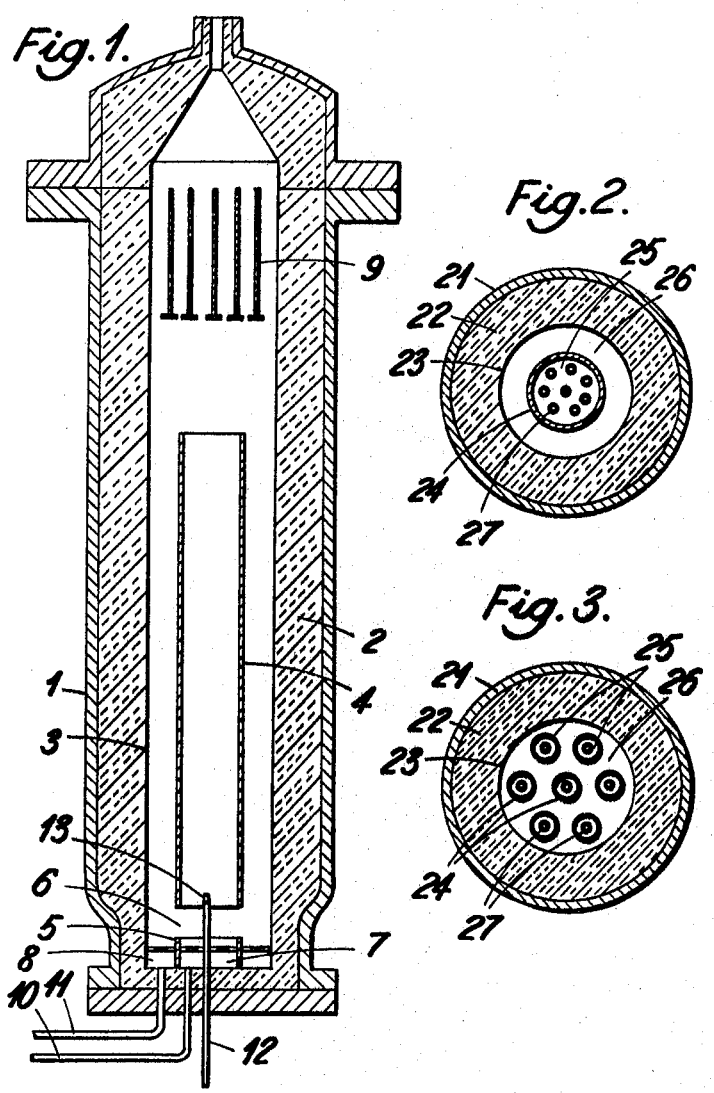
Inventors
Frederick Jones Dent
Brian Hoyle Thompson
Henry Lawrence Conway
Watson, Cole, Grindle & Watson
Attorneys

United States Patent Office 3,484,219
Patented Dec. 16, 1969

3,484,219
PROCESS AND APPARATUS FOR PERFORMING CHEMICAL REACTIONS
Frederick James Dent, Brian Hoyle Thompson, and Henry Lawrence Conway, Solihull, England, assignors to The Gas Council, London, England, a British body corporate
Filed July 21, 1966, Ser. No. 566,947
Claims priority, application Great Britain, Aug. 17, 1965, 35,279/65; Oct. 1, 1965, 41,810/65
Int. Cl. C10g 9/32
U.S. Cl. 48—102   8 Claims

ABSTRACT OF THE DISCLOSURE

A hydrocarbon-rich gas is produced by hydrogenating a fluid hydrocarbon-containing material, e.g. crude petroleum, in a fluidized bed of a material which is not consumed in the reaction. The bed continuously circulates in a reaction vessel around a dividing member within the vessel. The fluid material is introduced at or near the base of the vessel into a zone of ascending particles where it is mixed with and reacts with the hydrogenating gas.

---

This invention relates to a process and apparatus for performing a chemical reaction between a gas and a fluid material to produce a gaseous product, particularly of the kind where the reactants are used to maintain a bed of particles in a fluidized state, the fluid reactant is injected or atomized into the reactant gas within the fluidized bed, and a gaseous product is recovered from above the level of the fluidized bed. The invention also relates to a method of operating a fluidized bed.

The chemical reaction with which the invention is particularly, though not exclusively, concerned is the hydrogenation under pressure of hydrocarbon-containing oils to produce a gas rich in gaseous hydrocarbons. The invention is applicable to all oils, but is especially suitable for treating such oils as crude petroleum, and fractions up to, and including, heavy fuel oils that cannot be completely evaporated and hence cannot be mixed in the vapour form with hydrogenating gas externally to the reaction vessel.

By "hydrocarbon-containing oils" is meant materials which are liquid at ordinary temperature, and which consist wholly or mainly of hydrocarbons, for example, liquid bitumes, such as an oil or tar obtained by the distillation of coal, petroleum oil or a liquid fraction obtained therefrom. The oil is subjected to interaction with hydrogen to produce a gas containing gaseous hydrocarbons by passing the oil and hydrogen or a gas containing hydrogen through a bed of a particulate solid material maintained in the fluidized state by the gas at such a temperature within the range of 500° C. to 1000° C. and under such a pressure not below 3 atmospheres that substantially the whole of the hydrocarbons in the oil that undergo reaction with hydrogen are converted into gaseous hydrocarbons or into gaseous hydrocarbons and condensable aromatic hydrocarbons. The temperature is advantageously within the range of 600° C. to 800° C.

The pressure is advantageously within the range of 20 to 75 atmospheres but higher pressures may be used, for example, up to or exceeding 200 atmospheres.

The hydrogenating gas can be made by any known means, for example, by the gasification of hydrocarbons or of solid fuels in steam, with or without oxygen or air. It may be advantageous to raise the concentration of the hydrogen in the hydrogenating gas by applying methods of carbon monoxide conversion and carbon dioxide removal to any desired degree. It is preferable to generate the hydrogenating gas by a method which delivers it at or above the pressure at which the hydrogenation process is to operate.

The hydrogenating gas, instead of being derived from a separate source, may be obtained by treating a part of the hydrocarbon-containing gas produced to convert a part or the whole of the hydrocarbons therein into hydrogen. Such conversion of hydrocarbons includes conversion as described above into hydrogen and carbon monoxide with or without subsequent reaction of a part or the whole of the carbon monoxide so formed with steam to produce further hydrogen. Reference is directed to our British patent specification No. 830,960 for a further description of the process features of this chemical reaction.

In the hydrogenation of oils, whether they can be completely evaporated or not, it is necessary at least to provide means for controlling, and obtaining uniformity of, temperature within the reaction space in the face of the exothermicity of the reactions. In addition, when the oil cannot be completely evaporated, provision must be made at least:

(a) For spraying or atomizing the oil into the reaction space or into a region whence the atomizing oil is conveyed into the reaction space;

(b) For accommodating that part of the carbonaceous material of the oil (a substantial fraction of the potential Conradson carbon) which under reaction conditions will be carbonized rather than be hydrogenated.

The construction and operation of a plant embodying particular methods of providing these requirements have previously been described in our British Patent No. 830,960. The plant comprises a reaction vessel enclosing a fluidized bed of particulate solid material, for example, coke, a duct or downcomer, with a transfer vessel at its lower end, and a riser, the whole assembly providing for circulation of the bed, built within an internally insulated pressure vessel. The greater part of the supply of hydrogenating gas is admitted at the base of the riser and, entraining solid particles, causes the bed to circulate rapidly from the transfer vessel, up the riser, through the reaction vessel proper and back to the transfer vessel down the downcomer. Oil is atomized into the stream of hydrogenating gas preferably at the base of the riser. It should be noted that the terms "riser" and "downcomer" are used in our prior Patent No. 830,960 to mean passages outside the fluidized bed. In the present specification, these terms are used to mean regions within the fluidized bed.

In the prior system, the fluidized bed, especially when in rapid circulation round the apparatus, provides a region of controlled and uniform temperature, and conveys heat from the reaction space proper to the transfer vessel and the point of introduction of preheated reactants. The region into which the oil is sprayed contains a dilute suspension of solid particles in the hydrogenating gas. The particles are able to take up on their surfaces that part of the oil, the heavy fraction, which does not rapidly evaporate, and to remain in dilute suspension long enough for this heavy fraction to carbonize or be hydrogenated before the particles come into close contact with one another in the reaction vessel proper when they would agglomerate if the material on their surfaces were still sticky. This prior system has several disadvantages which are discussed below immediately before the examples.

It has now been surprisingly found that, provided that recirculation of the particles of the fluidized bed is ensured, the downcomer, riser and transfer vessel outside the fluidized bed can be dispensed with and the oil and hydrogen mixed directly within the bed.

Recirculation of the particles in a fluidized bed is not a novel concept in itself, but prior proposals have entirely different objectives from those of the present invention.

Thus, our British Patent No. 964,776 relates to the gasification with steam and oxygen of a fluidized bed of particulate solid ash-containing carbonaceous fuel. The reaction with oxygen is strongly exothermic and circulation of the fluidized bed may be necessary in order to prevent agglomeration of the ash. In continuous operation, further carbonaceous fuel is continuously added to the vessel to replace that consumed by the reaction. The prior process is distinguished from that of the present invention by the fact that the particles forming the fluidized bed of the present invention are either inert or catalytic, but are not in either case consumed by the reaction taking place.

United States specification No. 2,606,144 to Leffer relates to the coking of heavy hydrocarbon fuels in a bed of particles maintained in the fluidized state by a supply of inert gas. In this case, a substantial proportion of the carbon is deposited on the particles of the bed, which thus rapidly increase in size, and are removed from the system. Smaller particles are recirculated through a central downcomer. Leffer's object is to grow and separate coke particles resulting from thermal decomposition of a single feedstock; it is likely that such particles may be formed by the agglomeration of smaller ones as well as by the growth of individual particles due to deposition. An object of recirculation in the present invention is to prevent agglomeration of the particles during the reaction between at least two liquid or gaseous reactants.

Accordingly, the present invention provides in one aspect a method of operating a fluidized bed, which method comprises maintaining a bed of particles in the fluidized state in a reaction vessel having mounted therein at least one dividing member which is shorter than the internal length of the vessel and which divides the interior of the vessel into at least two regions, at least one to act as a riser for the fluidized bed and at least one to act as a downcomer therefor, all the regions being in communication with each other, within the fluidized bed, beyond the ends of the dividing member or members, so as to provide a continuous circulation of particles up the riser or risers and down the downcomer or downcomers, mixing at least two liquid or gaseous reactants within the fluidized bed and recovering a gaseous reaction product from the reaction vessel.

The present invention provides in another aspect a method of performing a chemical reaction in a fluidized bed between a reactant gas and a fluid material, especially one which is liable under the action of heat to produce deposits or cause the agglomeration of particles in the fluidized bed, or one in which it is important to maintain uniformity of temperature in the fluidized bed, or both, wherein the bed of particles is held in the fluidized state in a reaction vessel having mounted therein at least one dividing member which is shorter than the internal length of the vessel and which divides the interior of the vessel into at least two regions, at least one to act as a riser for the fluidized bed and at least one to act as a downcomer therefor, all the regions being in communication with each other beyond the ends of the dividing member or members, the reactants are so supplied that the bed of particles is maintained in the fluidized state and in continuous circulation up the riser or risers and down the downcomer or downcomers and the fluid material is injected or atomized into the reactant gas within the fluidized bed through at least one nozzle associated with each riser.

According to yet another aspect, the invention provides apparatus for performing a chemical reaction between a reactant gas and a fluid material to produce a gaseous product, which apparatus comprises an elongated thermally insulated reaction vessel, to be held in a vertical position and to contain a fluidized bed, having mounted within it at least one dividing member which is shorter than the internal length of the vessel and which divides the interior of the vessel into at least two regions, at least one to act as a riser for the fluidized bed and a region surrounding the riser or risers to act as a downcomer therefore, all the regions being in communication with each other beyond the ends of the dividing member or members, means for supplying the reactant gas at the lower end of the reaction vessel so as to maintain at least one zone of ascending particles in the fluidized state in the riser or risers and a zone of descending particles in the fluidized state in the downcomer, at least one nozzle associated with each riser within the reaction vessel for injecting or atomizing the fluid material into the reactant gas and an outlet for a gaseous reaction product at the upper end of the reaction vessel.

In this specification, the word "gas" means that the the substance is in the gas phase under the stated conditions, whatever its state may be at standard temperature and pressure. Also, the word "fluid" covers materials, which are either gaseous or liquid under the stated conditions.

It will frequently be convenient to use the reactants for maintaining the bed of particles in the fluidized state. However, the invention covers the use of any desired means for so maintaining the bed of particles.

The reaction vessel may be cylindrical and thermally insulated and surrounded by a pressure vessel. When the reaction vessel is reasonably small, it is convenient to use a single dividing member, being a hollow cylindrical member or a venturi, which divides the interior of the vessel into a central region of substantially circular cross-section to act as a riser and a surrounding region of substantially annular cross-section to act as a downcomer.

When the reaction vessel is larger, it may be preferable to provide several dividing members, for example, from 3 to 10, which divide the interior of the vessel into several regions of substantially circular cross-section to act as risers and a surrounding region to act as a downcomer. The surrounding region may, if desired, be divided into a plurality of downcomer regions by means of suitable vertical partitions.

Reactant gas may be distributed from one end of the reaction vessel over the cross-sectional area of the riser or each riser by any desired means, for example, a perforated distributor plate. There may be provided, as a distributor box, a small space below the distributor plate into which the reactant gas is supplied. Suitable means are described in our British patent specification No. 1,036,890. There may be provided one or more further dividing members extending a short distance upwards from the distributor plate to guide the reactant gas up the riser or risers. This also prevents particles descending the downcomer or downcomers from sweeping immediately past the distributor plate, and perhaps even through it against the upward gas stream. With the further short dividing member or members, there is an ordinary fluidized bed immediately above the distributor plate.

In order to keep the particles of the fluidized bed flowing from downcomer to riser, it is advisable to maintain the zone of descending particles in the downcomer or downcomers in a fluidized state. This may be done by providing an auxiliary supply of gas, conveniently the reactant gas, through an auxiliary distributor box and plate below each downcomer. Where gas is to be used to maintain the bed of particles in the downcomer or downcomers in a fluidized state there may be provided a single distributor box and plate below the risers and downcomers. This box and plate are preferably divided, for example by a downward extension of the short dividing member or members extending above the distributor plate, into two or more regions to correspond with the regions in the fluidized bed, each region having a separate supply of gas. This has the advantage of allowing independent control over the gas supplies to the distributor plates.

Insulation of the reaction vessel from the pressure vessel and from the atmosphere may be by any convenient means, for example, as described in our United States Patent No. 3,231,339.

The fluid reactant material is injected (if gaseous) or atomized (if wholly or partly liquid) into a mixture of the reactant gas and ascending particles in the fluidized bed. The injection or atomizing nozzle or nozzles should be reasonably near the bottom of the dividing member or members so as to give a long contact time for the reactants. Provided that they are directed upwardly, and that the discharge from them does not interfere with recirculation, the nozzles may be below the level of the dividing members. More than one nozzle may be employed associated with each riser. Gas, for example the reactant gas, may be supplied to the nozzle or nozzles to assist in atomizing a liquid reactant.

In the particular case of the hydrogenation of oils, air or oxygen may be supplied to the reaction vessel to maintain the temperature. If air is to be admitted, this is best done below the atomizer level to avoid combustion of atomized oil.

Optionally, baffles may be mounted in the reaction vessel above the dividing member or members. If the baffles are introduced sufficient particulate solid material is introduced to cover them. Their function is to eliminate any residual tendency which may exist for bubbles of reactants and products to pass through the bed or for spouting to occur. They may thus be used to ensure completion of reactions and to prevent entrainment of solids out of the reactor, without any of the disadvantages of the baffles in the known apparatus. Baffles as used in the present invention are outside the region in which circulation of the fluidized bed is positively ensured, but even when baffles are used, a very large proportion of the bed is within the circulation path, only that portion in which the baffles are immersed being excluded. Even so, there is some interchange of particles between that part of the bed which is positively circulated and that part which is not. Hence, temperature control over the bulk of the reaction space is assured.

If desired, the feature of the known procedure, in which heat exchangers, for example, heating or cooling coils, are used, may be included. Such coils would be immersed in a fluidized bed partly or completely separated from the aforesaid bed, for example, by a perforated plate, and situated above the baffles if used.

The various conditions necessary for operating a fluidized bed, that is to say, the pressure and velocity of the fluidizing gas and the size of the particles, are well known. The conditions of temperature and pressure required for any particular chemical reaction will also be known. In general, the fluidized bed may be formed of particles of any inert material, though the material may act as a catalyst if the reaction is one requiring a catalyst. In the hydrogenation of oils it is convenient to use coke. It may be found, with some reactions, that the size of the individual particles and the volume of the bed gradually increase, and provision can be made for an overflow or withdrawal of particles from the bed.

The invention is illustrated by the accompanying drawings, in which:

FIGURE 1 is a sectional side elevation of one reaction vessel, and

FIGURES 2 and 3 are cross-sections of alternative reaction vessels.

The following description is with reference to FIGURE 1 and to the hydrogenation of crude oil.

Within a pressure vessel 1 and separated from it by insulation 2 there is a cylindrical reaction vessel 3 within which is a coaxial cylinder 4 mounted so as to be spaced away from a shorter cylinder 5 by a gap 6. There is a shallow compartment at the base of the vessel which is divided by the shorter cylinder 5 into a central cylindrical chamber 7 and an annular chamber 8. These chambers, which are constructed according to our British application No. 1,036,890 provide means for obtaining uniformity of distribution of gas into the cylindrical and annular spaces above the top surface of the compartment, which is a perforated plate. The insulating space between the reaction vessel and pressure shell may be, but is not shown as, as in our United States Patent No. 3,231,339.

Sufficient particulate solid material, for example, coke, is introduced to cover the upper end of the central tube and substantially the whole quantity is caused to circulate up the whole length of the central tube and down the whole length of the annulus between the tube and the liner by introducing a large proportion of the hydrogenating gas through pipe 10 into the chamber 7 and thence into the base of the central tube. Sufficient hydrogenating gas is introduced through pipe 11 into the chamber 8 and hence into the annulus to ensure proper fluidization of the descending solid particles.

By preheating the hydrogen supplies, the whole circulating bed can be brought to a temperature at which reaction is initiated when oil is introduced. The oil is supplied, for example, through an inner tube in pipe 12 which is enclosed within an outer tube while a supply of hydrogenating gas to assist atomization flows up the annulus between the tubes. The oil and the atomizing hydrogen meet at or near the atomizing nozzle 13. The circulating bed ensures uniformity of temperature, the level of which can be controlled by appropriate adjustment of the preheat temperature.

If baffles 9 are used, they are located, as shown, at the top of the reaction vessel above the end of the central tube. They are covered with coke but, as explained above, the additional quantity of coke required to cover them is not within the region in which the circulation of coke is positively assured.

There may be a plurality of oil supply pipes and atomizers within the central tube. If the pressure were raised several-fold it might be necessary to supply all the hydrogenating gas to the atomizers (for a chosen oil/hydrogen ratio). Additional fluidizing gas would then be needed and this could be, for instance, recycled product gas or, in more general terms, some inert diluent.

Though the density of the fluidized bed within the central tube is greater than in the riser of the known system, it has surprisingly been found that, contrary to what might have been expected, there is little or no tendency for agglomeration of the particles to take place.

In both FIGURES 2 and 3, like numerals denote like parts. In FIGURE 2, a pressure vessel 21 contains insulation 22 and a liner 23 defining the reaction vessel. A single dividing member 24 divides the reaction vessel into a cylindrical region 25 to act as a riser for the fluidized bed and concentric annular region 26 to act as a downcomer. Associated with the riser 25 are seven nozzles 27 for atomizing a hydrocarbon-containing oil into the hydrogenating gas in the fluidized bed.

The arrangement of pressure vessel 21, insulation 22 and liner 23 in FIGURE 3 is as in FIGURE 2. Seven dividing members 24 divide the reaction vessel into seven separate cylindrical regions 25 to act as risers for the fluidized bed, and a region 26 to act as a common downcomer. Associated with each riser 26 is a nozzle 27 for atomizing a hydrocarbon-containing oil into the hydrogenating gas in the fluidized bed.

For larger plants, the vessel of FIGURE 3 is preferred, as the risers can then be made of such a size that sideways surging of the fluidized bed inside them is prevented, and the risers can act as vertical baffles to prevent sideways surging in the common downcomer surrounding them.

The apparatus and mode of operation of this invention have several advantages as compared with the known system.

(1) The elimination of the downcomer, riser and transfer vessel (the latter being replaced by the gap 6) enables a much shorter vessel to be constructed and used to per-form the same duty. The design of the internals is much less elaborate and their construction is simplified. The said internals are consequently much better able to resist the stresses which may result from thermal expansion.

(2) The high gas and particle velocities which are associated with transport up the riser are no longer required. As a result:

(a) Risk of erosion of the structure by the particles when they are abrasive is much reduced;

(b) The tendency for reactants to pass through the bed as large bubbles or as a jet, causing "spouting," is much reduced. When these phenomena occur, as they may in the known system, fluidization may be of poor quality, and the reduced residence time of the reactants within the bed may lead to reaction being completed outside the bed; this can lead to carbon deposition.

In the known method, baffles have been used within the circulating fluidized bed to increase the opportunity to complete reaction; but they hamper circulation and, if the bed is not always kept fluidized, they impede restarting fluidization from the static condition.

(3) The riser of the known system is eliminated. Thus, the advantage of a plurality of atomizers can be secured without it being necessary to provide a riser for each. Such risers present the difficulty that if the bed is allowed to become static they fill with solid particles and it may be impossible to restart fluidization. It is then necessary to empty the system of the solid material.

(4) Positive means are provided to ensure the circulation of substantially the whole of the bed, up the central tube and down the outer annular region, while good fluidization is obtained without including baffles within the circulation path.

In addition the apparatus and method of operation of this invention provide at least as satisfactory a means as do the known apparatus and method for controlling the temperature of the reaction space to a prescribed value and for ensuring its uniformity.

There follow two examples which illustrate the invention.

EXAMPLE I

A crude oil (Hassi-Messaoud—Algeria) of specific gravity 0.809 containing 86.2 percent carbon, 13.4 percent hydrogen and 0.4 percent sulphur was hydrogenated at 750° C. and 750 p.s.i.g. in an apparatus similar to FIGURE 1. The reaction vessel was 16 in. I.D. and 20 ft. long and the tube 4 was 11⅝ in. I.D. and 16 ft. long. The fluidized bed material was crushed coke sized below 36 B.S. mesh. The hydrogenating gas was of composition, percent by volume:

| | |
|---|---|
| $CO_2$ | 0.1 |
| $H_2$ | 90.3 |
| $CO$ | 2.9 |
| $CH_4$ | 6.2 |
| $N_2$ | 0.5 |

14,500 s.c.f. per hour of this gas was fed at 580° C. to chamber 7, 2,500 s.c.f. per hour at 650° C. to chamber 8 and 9,000 s.c.f. per hour at 350° C was equally divided between four atomizers situated near the bottom of tube 4. 1,300 s.c.f. per hour of air was admitted into the bed within tube 4 below the atomizers to help maintain reaction temperature. 867 lbs. of oil per hour was fed at 350° C., equally divided between the four atomizers. 29,010 s.c.f. per hour of product gas were obtained, of composition, percent by volume:

| | |
|---|---|
| $Co_2$ | 0.1 |
| Unsaturated hydrocarbons: | |
| $\quad C_xH_y$ | 0.4 |
| $H_2$ | 37.3 |
| $CO$ | 1.2 |
| $CH_4$ | 41.2 |
| $C_2H_6$ | 14.8 |
| $N_2$ | 5.0 | together with 179 lb. of condensate of composition, percent by weight; paraffins, 0.7; benzene, 54.1; toluene, 4.0; xylenes, 0.7; higher monocyclic aromatics, 0.6; naphthalene, 14.9; methyl naphthalene, 0.8; higher polycyclic aromatics 23.6; (distillation losses, etc. 0.6). 0.3 percent of the carbon in the oil supplied was deposited and was taken up on the coke particles. Temperatures were uniform within the bed, both in this example and in Example II, to within 10° C. or better, except in the immediate vicinity of the atomizer and immediately above the distribution plate, where of course the much cooler reactants were entering.

EXAMPLE II

A crude oil (Hassi-Messaoud—Algeria), of specific gravity 0.808 containing 86.3 percent carbon, 13.4 percent hydrogen and 0.3 percent sulphur was hydrogenated at 750° C. and 650 p.s.i.g. in an apparatus similar to FIGURE 1. The reaction vessel was 16 in. I.D. and 20 ft. long and the tube 4 was 11⅝ in. I.D. and 16 ft. long. The fluidized bed material was crushed coke sized below 36 B.S. mesh. The hydrogenating gas was of composition percent by volume:

| | |
|---|---|
| $CO_2$ | 20.4 |
| $H_2$ | 69.7 |
| $CO$ | 2.5 |
| $CH_4$ | 4.9 |
| $C_2H_6$ | 1.8 |
| $N_2$ | 0.7 |

23,930 s.c.f.h. of this gas was fed at 608° C. to chamber 7, 2,500 s.c.f.h. at 650° C. to chamber 8 and 9,040 s.c.f.h. at approximately 400° C. was equally divided between four atomizers situated near the bottom of tube 4. 2,750 s.c.f.h. of air was admitted to the bed within tube 4 below the atomizers to help to maintain reaction temperature. 918 lb. per hour of the crude oil was fed at 350° C. equally divided between the four atomizers. 38,490 s.c.f.h. of product gas was obtained, of composition, percent by volume:

| | |
|---|---|
| $CO_2$ | 18.2 |
| Unsaturated hydrocarbons: | |
| $\quad C_xH_y$ | 0.6 |
| $H_2$ | 29.5 |
| $CO$ | 2.7 |
| $CH_4$ | 30.9 |
| $C_2H_6$ | 12.3 |
| $N_2$ | 5.8 | together with 178 lb. of hydrocarbon condensate of composition, percent by weight: paraffins, 0.8; benzene, 50.4; toluene, 4.4; xylenes, 0.7; higher monocyclic aromatics, 0.5; naphthalene, 14.3; methyl naphthalene, 0.6; higher polycyclic aromatics, 27.9; (distillation losses, etc. 0.4). 0.45 percent of the carbon in the oil supplied was deposited and was taken up on the coke particles.

In these two examples, air was used simply to maintain temperature in view of the disproportionately high heat losses experienced from the comparatively small pilot plant. Calculations show that, in the hydrogenation of Hassi-Messaoud crude oil in a plant of commercial size, the use of air would be unnecessary.

We claim:

1. A method of reacting a fluid hydrocarbon-containing material with a hydrogenating gas in a fluidized bed of particles which are substantially not consumed in the reaction, wherein the bed of particles is held in the fluidized state in a reaction vessel having mounted therein at least one dividing member which is shorter than the internal length of the vessel and which divides the interior of the vessel into at least two regions, at least one to act as a riser for the fluidized bed and at least one to act as a downcomer therefor, all the regions being in communication with each other beyond the ends of the dividing member, wherein the bed of particles is maintained in the fluidized state and in continuous circulation up the riser and down the downcomer, the fluid hydrocarbon-containing material is injected into a mixture of the hydrogenating gas and ascending particles in the fluidized bed near the base of the riser, and the fluid hydrocarbon-containing material reacts with the hydrogenating gas within said riser.

2. A method as claimed in claim 1 wherein the fluid material is crude petroleum.

3. A method as claimed in claim 1 wherein a single dividing member divides the interior of the vessel into a central region of substantially circular cross-section to act as a riser and a surrounding region of substantially annular cross-section to act as a downcomer.

4. A method as claimed in claim 1 wherein several dividing members divide the interior of the vessel into a plurality of regions of substantially circular cross-section to act as risers and a surrounding region to act as a downcomer.

5. A method as claimed in claim 1 wherein the reactants are so supplied that the bed of particles is maintained in the fluidized state and in continuous circulation up the riser and down the downcomer, and the fluid material is introduced into the reactant gas within the fluidized bed through at least one nozzle associated with each riser.

6. A method as claimed in claim 1 wherein the fluid material is a crude petroleum fraction, up to, and including, heavy fuel oil.

7. A method as claimed in claim 6 wherein the oil is subjected to interaction with hydrogen to produce a gas containing gaseous hydrocarbons by passing the oil and the hydrogenating gas through a bed of a particulate solid material maintained in the fluidized state by the gas at a temperature of from 500° C. to 1000° C. and under a pressure of from 3 to 200 atmospheres.

8. Apparatus for performing a chemical reaction between a reactant gas and a fluid material to produce a gaseous product, which apparatus comprises an elongated thermally insulated reaction vessel, to be held in a vertical position and to contain a fluidized bed, having mounted within it at least one dividing member which is shorter than the internal length of the vessel and which divides the interior of the vessel into at least two regions, at least one to act as a riser for the fluidized bed and a region surrounding the riser to act as a downcomer therefor, all the regions being in communication with each other beyond the ends of the dividing member a perforated distributor plate to carry the bed of particles, means for supplying the reactant gas at the lower end of the reaction vessel through the plate to the bed below the riser so as to maintain at least one zone of ascending particles in the fluidized state in the riser and a zone of descending particles in the fluidized state in the downcomer, at least one further dividing member extending a short distance upwards from the distributor plate to guide the reactant gas up the riser, at least one nozzle associated with each riser within the reaction vessel for injecting the fluid material into the reactant gas and an outlet for a gaseous reaction product at the upper end of the reaction vessel.

References Cited

UNITED STATES PATENTS

| 2,582,711 | 1/1952 | Nelson | 201—31 |
| 2,606,144 | 8/1952 | Leffer | 48—211 XR |
| 2,591,595 | 4/1952 | Ogorzaly | 201—31 XR |
| 2,849,384 | 8/1958 | Voorhies et al. | 23—288.35 |

FOREIGN PATENTS 873,832  7/1961  Great Britain.

MORRIS O. WOLK, Primary Examiner

R. E. SERWIN, Assistant Examiner

U.S. Cl. X.R.

23—284, 288; 48—213